(No Model.) 4 Sheets—Sheet 3.
H. B. VAN BENTHUYSEN.
GAS GENERATING FURNACE.

No. 363,023. Patented May 17, 1887.

Witnesses:
Jesse Hall Jr
Edwin A. Barkley

Inventor.
Henry B. Van Benthuysen

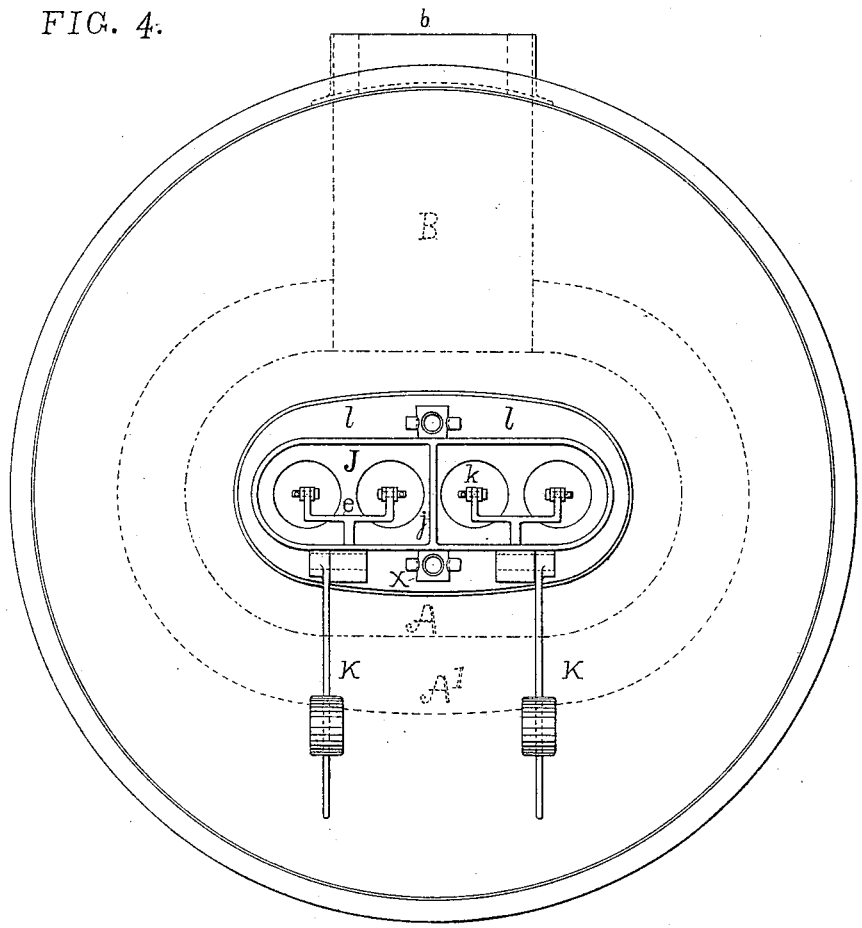

United States Patent Office.

HENRY B. VAN BENTHUYSEN, OF PHŒNIXVILLE, PENNSYLVANIA.

GAS-GENERATING FURNACE.

SPECIFICATION forming part of Letters Patent No. 363,023, dated May 17, 1887.

Application filed August 2, 1886. Serial No. 209,735. (No model.)

*To all whom it may concern:*

Be it known that I, HENRY B. VAN BENTHUYSEN, a citizen of the United States, residing in Phœnixville, Chester county, Pennsylvania, have invented certain Improvements in Gas-Generating Furnaces, of which the following is a specification.

My invention relates to certain improvements in gas-generating furnaces for obtaining supplies of carbonic-oxide gas to be used for heating, puddling, melting, and smelting, and other furnaces in which a clear flame is preferable to that resulting from a direct consumption of fuel.

The main objects of my invention are, first, to provide means for so disposing of the ashes and clinkers at intervals, and while the furnace is in operation, that there shall be a uniform and continuous consumption of coal and generation of gas; second, for the purpose of utilizing inferior or refuse coals, which are not suitable for fuel, if used in the ordinary method; third, to prevent the adhesion of clinkers to the walls of the generating-chamber, which is a serious obstacle in furnaces constructed of brick, requiring much labor to loosen them, besides loss of gas and interruption to the steady operation of the furnace; fourth, to prevent the waste of coal, which has been a serious objection to furnaces of this class.

Reference is here made to my Letters Patent No. 280,691, bearing date July 3, 1883, for improvements in gas-generating furnaces.

The following improvements consist, mainly, in substituting iron for brick in the construction of the generating-chamber, for the purpose of preventing the adhesion of clinkers to the walls; also, the substitution of an ash-plate for the grate, with more powerful mechanism for operating it; also, the substitution of posts for the central portion of the casing and brick-work. One large opening for the flow of gas is substituted for the several smaller ones, and the bottom of this opening or passage is composed of an iron box, through which water is caused to circulate.

Other features of my invention will be referred to hereinafter.

Figure 1:
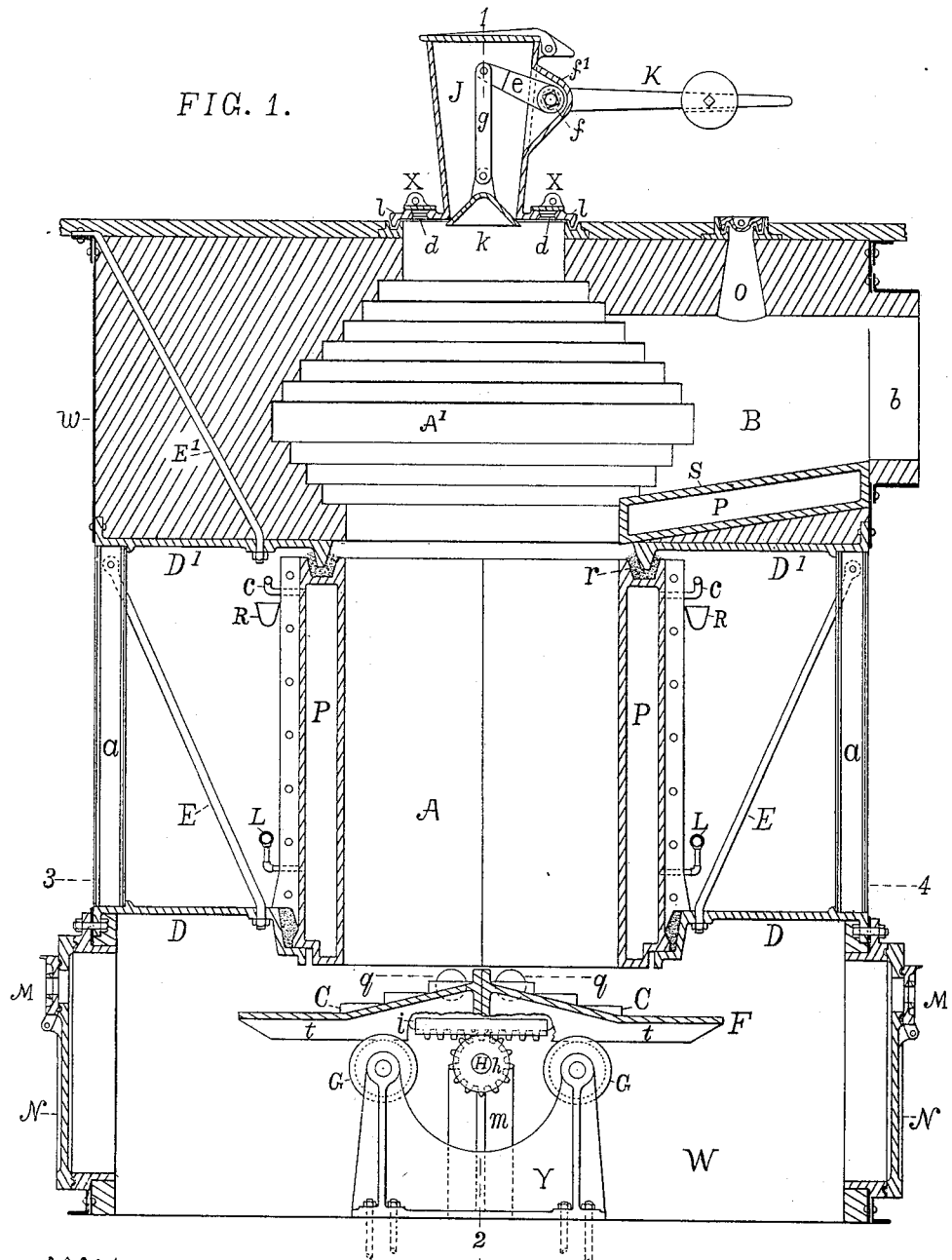
Figure 2:
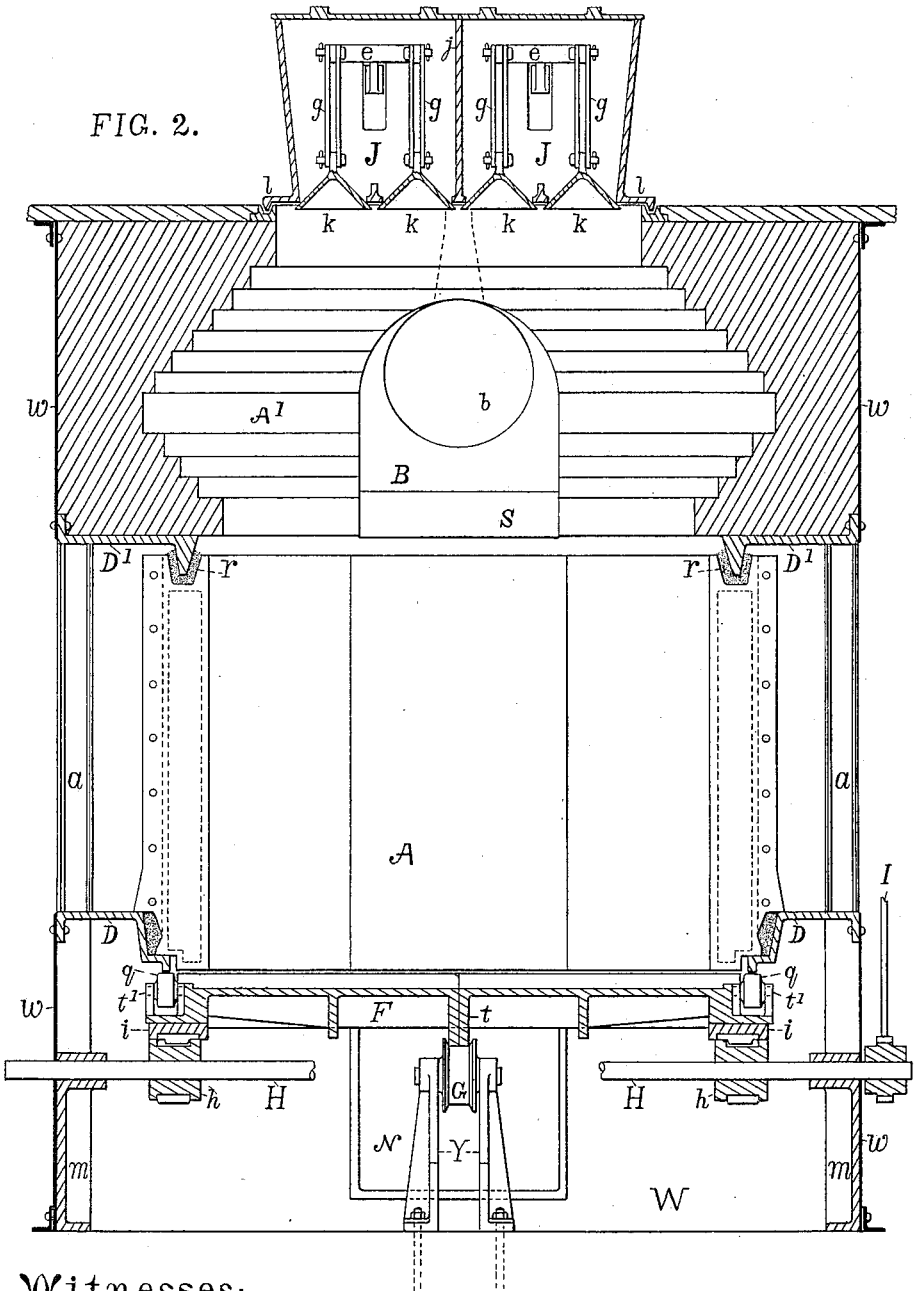
Figure 3:
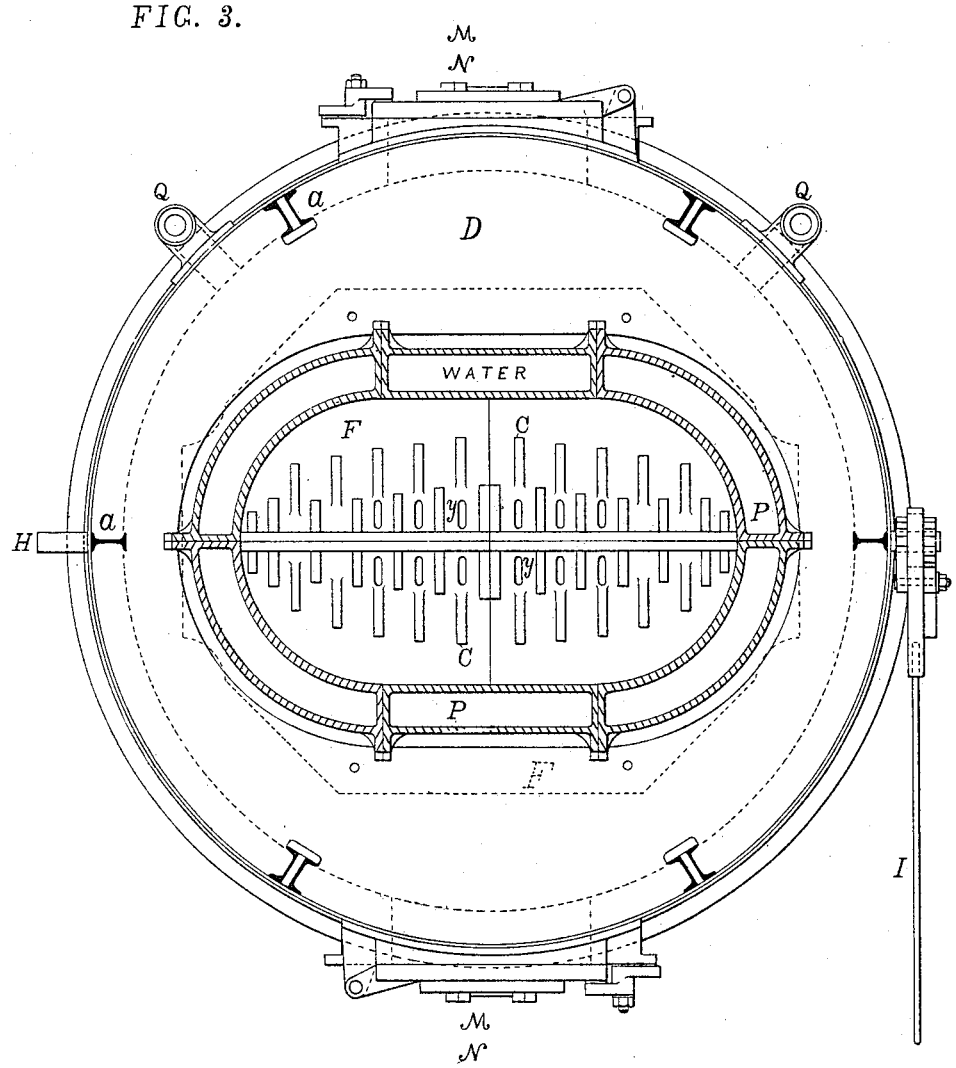

In the accompanying drawings, Figure 1, Sheet 1, is a vertical section of my improved gas-generator; Fig. 2, Sheet 2, a vertical section on the line 1 2, Fig. 1; Fig. 3, Sheet 3, a horizontal section through 3 4, Fig. 1; Fig. 4, Sheet 4, is a top view.

A substantial structure of iron and brick, preferably of circular form externally, is composed of the ash-pit W, the ash-plate F, gas-generating chamber A, receiving-chamber A', and hopper J, communicating therewith.

Surrounding the ash-pit is an iron casing, w, lined with brick. A plate, D, having a flange secured to the casing, and in part suspended by the diagonal rods E, supports the generating-chamber A independently of the superstructure above it. Another plate, D', resting upon the posts a, and in part sustained by the diagonal rods E', supports the masonry forming the receiving-chamber A' and passage B. The masonry is incased with iron w, which is secured to the flange of the plate D'.

The superstructure is supported entirely by the posts a a, in order to allow the iron generating-chamber room for expansion without injury to the masonry above it.

For the removal of accumulated ashes, the ash-pit is provided with large doors N N, at opposite sides. Through the upper portion of these large doors are openings, which are covered by the small doors M M. These openings are for the convenience of removing any obstruction to the free discharge of the ashes and clinkers from the ash-plate. In the small doors are windows, through which the operation of the ash-plate may be noted.

To the casing w of the ash-pit are secured bell-shaped pipes Q—two in this instance—which extend upward, and are expanded at the top to receive the air which is forced downward and into the ash-pit by a small jet of steam in a well-known manner.

The ash-plate F, placed a short distance below the lower extremity of the generating-chamber A, is constructed and combined with operating appliances in the following manner: The plate may be made whole or in parts and bolted together. The latter is preferable for the largest furnaces; also, for large furnaces, the central portion should be perforated or slotted for the admission of air and steam; but it is not requisite that any ashes should pass through the slots or perforations. The ash-plate is made considerably wider than the interior width of the generating-chamber, for the purpose of preventing any portion of the coal falling into the ash-pit.

The ash-plate is supported midway between its opposite ends by rollers G G, Figs. 1 and 2, the journals of which are adapted to standards Y, which are secured to a foundation. A central rib, t, of the ash-plate is adapted to fit freely between the flanges of the rollers, as shown in Fig. 2. At each end of the ash-plate are bearings t' for the journals of two small rollers, q q, which bear against the flange on the under side of the supporting-plate D. A shaft, H, having its bearings in standards m m, extends through the ash-pit, and to this shaft are secured two pinions, h h, one for gearing into the rack i, (shown in Fig. 1,) secured to the under side of the ash-plate at one end, and the other pinion gearing into a like rack under the other end of the ash-plate. These pinions and racks are flanged, so as to form additional supports for the ash-plate, and they cannot get out of gear, as the rising of the ash-plate is prevented by the small rollers q and the bottom flange on plate D.

The shaft H is furnished at one or both ends with an operating-lever, I, having two pawls connecting with two ratchets having teeth in opposite directions, so that by working the lever upward with the top pawl connected, the ash-plate will move forward, and by working the lever downward with the bottom pawl (which is counterbalanced) connected the ash-plate will move backward, or the reverse, as may be desired.

On referring to Fig. 1, it will be seen that the ash-plate is in part level and in part inclined, and on the upper surface are steps C, the highest of which is in the middle, and between the upper steps are slots y, for the admission of air and steam. The tendency of the steps is to force the ashes and clinkers outward through the openings when the ash-plate is moved forward or backward, and to project the same over the edges of the ash-plate into the pit beneath.

The generating-chamber A, for small furnaces, may be a single hollow iron shell; but for large generators, as in this case, it is preferably made in sections with flanges and bolted together, the joints being well secured to prevent the escape of gas. Each section is provided with spaces or passages P, for the circulation of water, to prevent the iron from becoming overheated. The water is introduced into each section near the bottom through the pipes L L, and flows out at the top through the pipes c into the trough R, and is conveyed away.

The top of the generating-chamber is formed into a groove, r, and filled with sand or clay, or other similar substance which will yield to the expansion of the iron and retain the gas.

In order to secure water-space at the lowest extremity of the generating-chamber, and also to secure the plate D from exposure to intense heat, an offset is made at the back of the lower end, where it rests upon the plate D. The opening in plate D is enlarged for the lateral expansion of the generating-chamber. The recess in plate D is filled with sand or other pliable material to prevent the escape of air or gas.

This method of construction leaves the parts free to expand, while at the same time the connection is secure against leakage.

The principal reason for making the generating-chamber oblong is to narrow down the breadth of the fuel and make it practicable to shear off and remove the ashes and clinkers at repeated intervals by means of a reciprocating ash-plate while the furnace is in operation. By thus effectually disposing of the ashes and clinkers as soon as they are formed, the operation of the furnace is rendered continuous.

As shown by dotted lines in the top view, Fig. 4, the receiving-chamber A' is of a form approximating to an oval; for, while it is not necessary to adhere to the precise form shown in the drawings, the opposite sides must be made on such a curve as to induce the brickwork to be self-sustaining.

On one side of the receiving-chamber A' is a large opening or passage, B, communicating with the outlet b for the delivery of the gas. At the bottom of the passage B is an iron box, S, through which a circulation of water is maintained.

In the management of my gas-generator the height of the coal introduced should never exceed the height of the iron generating-chamber; but if through ignorance or mismanagement a greater quantity should be introduced at any one time, so as to partially or wholly fill the receiving-chamber and enter the passage B, the box S prevents the adhesion of clinkers, and the conical opening O, at the top of the passage affords access for the removal of any ashes or clinkers accumulating in the passage. The central enlargement of the receiving-chamber is to secure space for the escape of gas when an excess of coal has been introduced.

In order to prevent the escape of gas when supplying the generator with coal, it is necessary to introduce the coal by means of a hopper having a cover on top and a valve in the bottom opening downward; and for the equal distribution of the coal the hopper should conform in shape nearly to that of the generating-chamber. For these reasons I secure to the top of the furnace an oval plate, to which is attached an oblong hopper, J, Figs. 1 and 2, separated by a partition, j, into two compartments, in the bottom of each of which are two openings, the edges of the latter forming seats for two cone-like valves, k k, opening downward.

A lever, e, having two arms, one connected to each valve with the links g, is secured to a fulcrum-pin, f, which passes through and has its bearings in a hollow extension, f', of the hopper J, Fig. 1, and to the same pin is secured the weighted arm K, the tendency of the latter being to keep the valves constantly closed.

When charging coal the cover is raised, the hopper filled, the cover closed, and the arm K lifted to allow the coal to pass downward.

For the purpose of observing the quantity and condition of the coal in the generater from time to time, and for the purpose of introducing a stirring-rod, one or more small holes, $d$, are made in the bottom plate, $l$, of the hopper, two in the present instance. Above each hole is a closely-fitting cover, X, adapted to beveled lugs to keep it in place.

I am aware that in furnaces of various kinds having certain parts constructed of iron it is a common practice to render such parts less destructible by making them hollow and providing apertures for the inlet and outlet of water in a continuous flow, commonly called "water-chills." I disclaim this method of protecting iron, and limit myself to the combination of such method with a new device.

The novelty of my generating-chamber consists in its shape and adaptation to the purpose to which it is applied. It is made of iron, because clinkers will not adhere to iron. It is made oblong to render it practical, as before stated, to operate an ash-plate beneath it and effectually remove the ashes and clinkers. The ends are curved, because that is the best shape for the purpose. It is supported by an offset or flange on the exterior near the base, in order that the inner surface may form the entire chamber. I make the base of the outlet-passage B of iron, for the same reason that clinkers will not adhere to it, and any lodgment thereon can be easily removed without interruption to the operation of the furnace.

I am aware that seal-joints and expansion-joints are in use for various purposes. I therefore disclaim such joints in a broad sense, and limit myself to a new combination.

I claim as my invention—

A gas-generating furnace divided into three sections by means of the plates D and D' and posts $a\ a$, and consisting of the brick chamber A', the iron box S, and the iron chamber A, in combination with the ash-plate F and mechananism for reciprocating it, substantially as shown and described.

In testimony whereof I have signed my name to this specification in the presence of two subscribing witnesses.

HENRY B. VAN BENTHUYSEN.

Witnesses:
   JESSE HALL, Jr.,
   EDWIN A. BARKLEY.